United States Patent [19]
Colip

[11] Patent Number: 5,338,101
[45] Date of Patent: Aug. 16, 1994

[54] MULTIPURPOSE FIFTH WHEEL STEP FRAME SEMI TRACTOR TRAILER

[76] Inventor: Merlynn Colip, 610 Woods Dr., Norton, Kans. 67654

[21] Appl. No.: 963,082

[22] Filed: Oct. 19, 1992

[51] Int. Cl.⁵ .................................................. B60P 1/04
[52] U.S. Cl. ................................... 298/17 R; 296/182; 296/184; 280/789; 280/800
[58] Field of Search ............... 280/789, 800; 296/182, 296/184; 298/1 R, 17 R, 17 B

[56] References Cited

U.S. PATENT DOCUMENTS

| | | | |
|---|---|---|---|
| 2,904,340 | 9/1959 | Simpson | 280/2 |
| 3,043,628 | 7/1962 | Hockensmith | 298/17 R |
| 3,272,546 | 9/1966 | Cooley | 294/2 |
| 3,814,479 | 6/1974 | Vornberger | 296/184 |
| 3,827,753 | 8/1974 | Pitts | 298/1 B |
| 4,049,285 | 9/1977 | Chieger | 296/182 |
| 4,132,323 | 2/1979 | Simmons | 280/789 |
| 4,273,382 | 6/1981 | Benson | 296/184 |
| 4,616,879 | 10/1986 | Booher | 298/10 |
| 4,817,537 | 4/1992 | Cripe et al. | 296/182 |
| 5,127,781 | 7/1992 | Roarty et al. | 296/182 |

*Primary Examiner*—Michael S. Huppert
*Assistant Examiner*—Gregory A. Morse
*Attorney, Agent, or Firm*—Zarley, McKee, Thomte, Voorhees & Sease

[57] ABSTRACT

A grain or silage box is mounted on a trailer frame and kept low to the ground through the addition of a step frame at the forward end of the trailer side frame members. The step frame includes a fifth wheel king pin for engagement with the fifth wheel plate of a semi-tractor. The step frame is hidden between the downwardly extending elongated box frame members when the box is in a lowered position. The box frame members are laterally stabilized by the step frame with the box in its lowered position on top of the trailer side frame members.

8 Claims, 2 Drawing Sheets

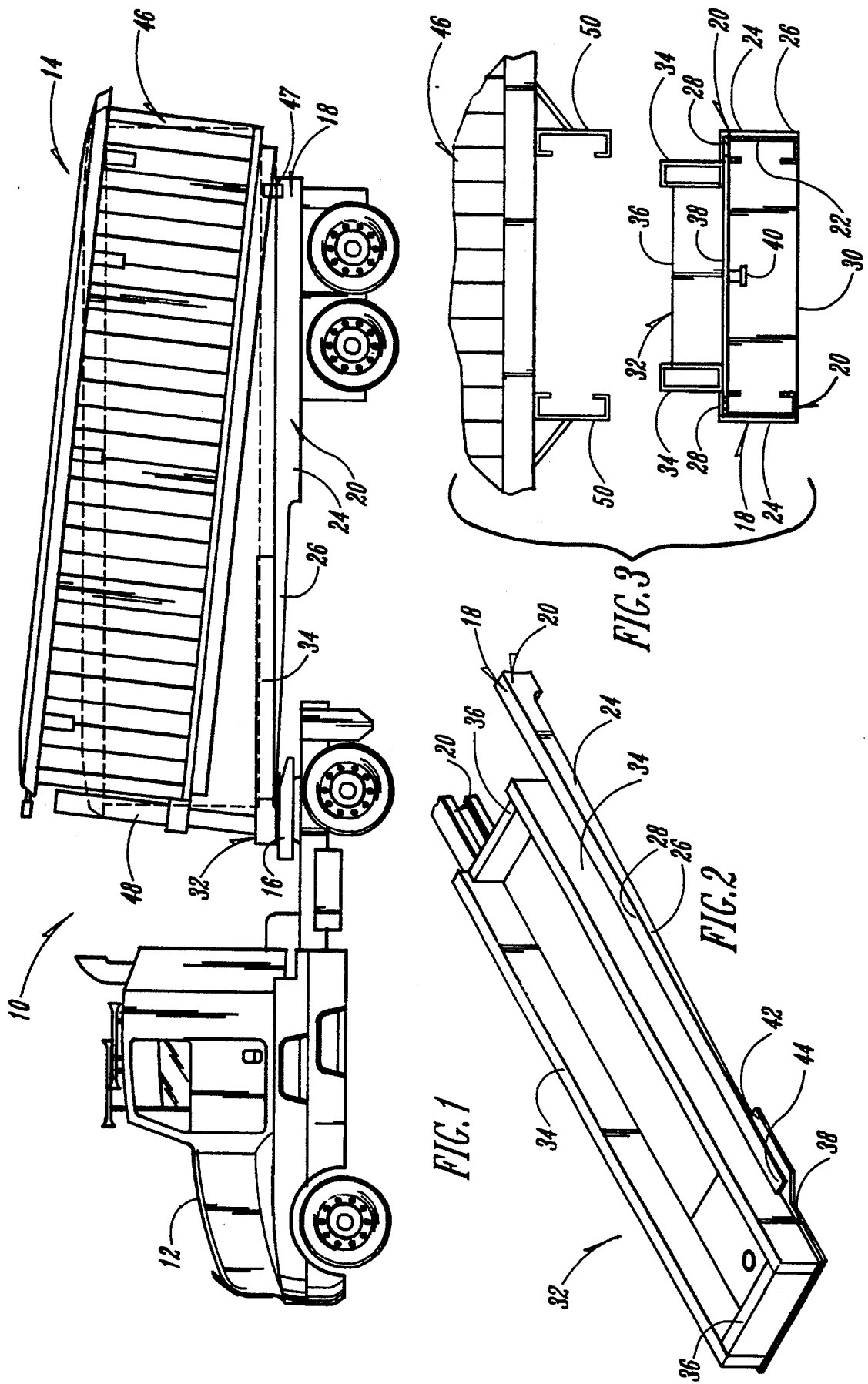

MULTIPURPOSE FIFTH WHEEL STEP FRAME SEMI TRACTOR TRAILER

BACKGROUND OF THE INVENTION

The use of a semi-tractor with a farm trailer would have advantages over a conventional farm truck. A semi-tractor is not limited to a single trailer but can be used with a variety of different trailers. Repairs and maintenance of the tractor can be made without tying up the trailer.

Many gravity dump trailers are available. However, many uses for farm trucks or trailers require hydraulic end dumping rather than gravity dumping. What the step frame trailer provides is a trailer designed to be fitted with an end dumping standard grain or silage box and a standard hydraulic lift hoist. The height of the semi-tractor fifth wheel plate determines the height of the trailer frame. Thus, what is needed is a way by which a grain or silage box can be kept as low as possible for ease of loading and unloading and for stability and yet be connected to a fifth wheel plate on a semi-tractor without modification of the box.

SUMMARY OF THE INVENTION

A semi-tractor trailer is provided which can be outfitted with a readily available grain or silage box and a standard hoist. The trailer has a pair of elongated forwardly extending, spaced apart side frame members which taper forwardly and upwardly at their forward ends where they are engaged by a step frame. The step frame is positioned above the trailer frame members and includes at its forward end a downwardly extending king pin engagable with the fifth wheel plate of a semi-tractor. Standard grain and silage boxes have spaced apart downwardly extending elongated channel frame members which nest with and rest on top of the trailer frame members for support and stability. The grain or silage box is pivoted at its rear end to the trailer frame and is raised and lowered by a hydraulic hoist either at its forward end or by an underbody hoist. The step frame is positioned laterally, inwardly of the trailer side frame members and grain or silage box frame members.

It is thus seen that the grain or silage box is maintained as low to the ground as possible by being mounted on a modified trailer frame which is connectable to the fifth wheel plate on a semi-tractor. The farmer now has the advantage of having a prime mover that is not restricted to a single trailer but instead can be used with any number of different drawn-type trailers or implements. In addition, by using a standard dolly converter the trailer may be pulled as a pup trailer in tandem with another trailer or it can be pulled by a medium to heavy duty farm tractor.

DESCRIPTION OF THE DRAWINGS

FIG. 1 is a side elevational view of the semi-tractor and trailer of this invention;

FIG. 2 is a fragmentary front perspective view of the trailer frame, including the step frame at the forward end thereof;

FIG. 3 is a front end view of the trailer and box raised showing the step frame positioned on and connected to the trailer frame side members;

DESCRIPTION OF PREFERRED EMBODIMENT

Figure 4:
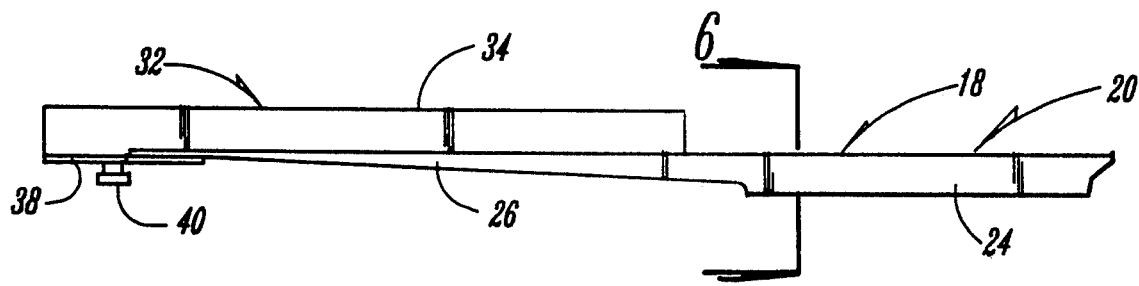
FIG. 4 is a fragmentary side elevation view of the trailer frame side members and step frame connected thereto.
Figure 5:
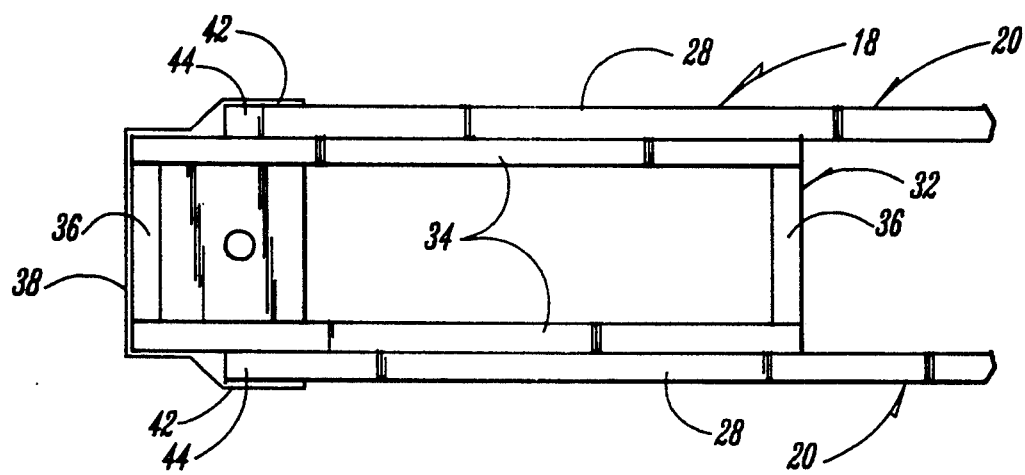
FIG. 5 is a top plan view thereof.
Figure 6:
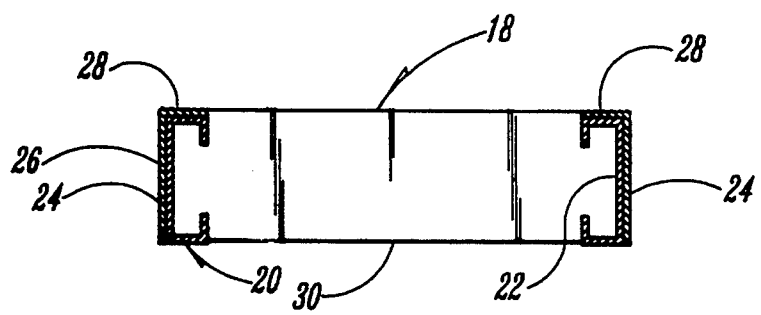
FIG. 6 is a cross-sectional view taken along line 6—6 in FIG. 4.

The semi-tractor and trailer of this invention are referred to in FIG. 1 by the reference numeral 10 that includes a semi-tractor 12 connected to a fifth wheel trailer 14. The semi-tractor 12 includes a fifth wheel plate 16 of a conventional design.

The trailer 14 includes a trailer frame 18 having spaced apart side frame members 20. Side frame members 20 are of a double wall construction that include an inner C-shaped member 22 with an outer wall 24 in overlapping relationship. The outer wall 24 has a vertical leg 26 integrally connected to a horizontal top leg 28. A forward end wall 30 interconnects the side frame members 20.

In FIG. 2 it is seen that the side frame members 20 taper upwardly and forwardly to allow for clearance in the space around the fifth wheel plate 16 on the semi-tractor 12. The reduced strength of these side frame members is compensated for by the addition of a step frame 32.

The step frame 32 is box-shaped and includes elongated side frame portions 34 and front and rear transverse portions 36. A king pin plate 38 is provided on the bottom side of the step frame 32 and includes the king pin 40 engagable with the fifth wheel plate 16. The rear end 42 of the king pin plate 38 is overlapped by the forward ends 44 of the side frame members 20.

The grain box 46 is pivotally connected at 47 to the rear end of the trailer frame 18 and is adapted to be raised and lowered by a hoist 48 of a conventional design not shown. The grain box 46 includes on its lower side downwardly extending elongated channel frame members 50. As seen in FIG. 3 the frame members 50 are in nesting relationship with the step frame 32 by the step frame portions 34 being positioned inwardly of the box frame members 50 thus hiding the step frame 32 when the box is in its lowered position. The step frame 32 functions to provide lateral stability of the front portion of the box 46 with the box 46 in its lower position with the bottom sides of the box frame members 50 engaging the top sides of the trailer frame side frame members 20.

Thus it is seen that the grain box 46 can be maintained as low as possible and yet the trailer frame 18 can be connected to the fifth wheel plate 16 through the step frame 32 connected to the top side of the trailer frame side members 20.

What is claimed is:

1. A semi-tractor and fifth wheel trailer comprising, said semi-tractor having a fifth wheel plate, said fifth wheel trailer having front and rear ends and having a trailer frame comprising a pair of elongated straight and continuous opposite side frame members extending from said rear end to adjacent said front end thereof, a step frame including front and rear ends and opposite side frame portions, said step frame being fixedly connected to the front end of said trailer and positioned above said pair of elongated side frame members, with said side frame portions having outside vertical longitudinal surfaces in substantially common vertical planes with inside vertical longitudinal surfaces on said opposite side frame members, a king pin mounted on the forward end of said step frame in engagement with said fifth wheel plate, a box on said trailer frame having a planar floor, front and rear ends and elongated spaced apart box frame members extending downwardly from said planar floor and extending from the front end of the box to the rear end of the box, said box frame members being positioned in nesting overlapping relationship with said step frame side frame portions and in direct parallel supporting engagement with said trailer side frame members by said box frame members being in common vertical longitudinal planes with said side frame members along their substantial length, and said box being pivotally connected at its rear end to said rear end of said trailer frame and lift means being provided for raising and lowering the front end of said box relative to said trailer frame.

2. The structure of claim 1 wherein said king pin is positioned on the bottom side of said step frame and extends downwardly.

3. The structure of claim 1 wherein said trailer side frame members have a reduced height at their forward ends.

4. The structure of claim 3 wherein said trailer side frame members taper upwardly and forwardly at their forward ends to provide said reduced height and allow clearance for said fifth wheel plate.

5. The structure of claim 1 wherein said step frame includes a king pin plate on the bottom forward end of said side frame portions and said king pin extends downwardly from said king pin plate.

6. The structure of claim 5 wherein said trailer side frame members at their forward ends overlap with the rear end of said king pin plate.

7. The structure of claim 1 wherein said step frame side frame portions are positioned laterally inwardly of said trailer side frame members and laterally inwardly of said grain box frame members whereby said box frame members limit lateral movement of said grain box.

8. A fifth wheel trailer having front and rear ends and having a trailer frame comprising a pair of elongated straight and continuous opposite side frame members extending from said rear end to adjacent said front end thereof, a step frame including front and rear ends and opposite side frame portions, said step frame being fixedly connected to the front end of said trailer and positioned above said pair of elongated side frame members, with said side frame portions having outside vertical longitudinal surfaces in substantially common vertical planes with inside vertical longitudinal surfaces on said opposite side frame members, a box on said trailer frame having a planar floor, front and rear ends and elongated spaced apart box frame members extending downwardly from said planar floor and extending from the front end of the box to the rear end of the box, said box frame members being positioned in nesting overlapping relationship with said step frame side frame portions and in direct parallel supporting engagement with said trailer side frame members by said box frame members being in common vertical longitudinal planes with said side frame members along their substantial length, and said box being pivotally connected at its rear end to said rear end of said trailer frame and lift means being provided for raising and lowering the front end of said box relative to said trailer frame.

* * * * *